United States Patent [19]

Satoo et al.

[11] Patent Number: 4,866,589
[45] Date of Patent: Sep. 12, 1989

[54] VOLTAGE RESONANCE TYPE SWITCHING POWER SOURCE APPARATUS

[75] Inventors: Masayoshi Satoo; Norikazu Tokunaga; Hisao Amano, all of Hitachi; Teruaki Odaka, Mobara; Yasuo Matsuda, Hitachi, all of Japan

[73] Assignees: Hitachi, Ltd., Tokyo; Hitachi Device Engineering Co., Ltd., Chiba, both of Japan

[21] Appl. No.: 178,654

[22] Filed: Apr. 7, 1988

[30] Foreign Application Priority Data

Apr. 8, 1987 [JP] Japan .................................. 62-84547
Apr. 13, 1987 [JP] Japan .................................. 62-88781
Jun. 2, 1987 [JP] Japan .................................. 62-138769

[51] Int. Cl.$^4$ ...................... H02M 3/335; H05B 6/68
[52] U.S. Cl. ....................................... 363/21; 363/97; 315/105; 219/10.55 B
[58] Field of Search ...................... 363/20, 21, 75, 95, 363/97, 131; 219/10.55 B; 315/105–107; 328/230, 270

[56] References Cited

U.S. PATENT DOCUMENTS

| | | | |
|---|---|---|---|
| 4,281,372 | 7/1981 | Kornrumpf | 363/20 |
| 4,318,165 | 3/1982 | Kornrumpf et al. | 363/21 |
| 4,593,167 | 6/1986 | Nilssen | 363/75 X |
| 4,595,973 | 6/1986 | Masuda et al. | 363/75 X |
| 4,620,078 | 10/1986 | Smith | 219/10.55 B |
| 4,672,159 | 6/1987 | Nilssen | 219/10.55 B |
| 4,680,506 | 7/1987 | Nilssen | 219/10.55 B |
| 4,704,674 | 11/1987 | Maehara et al. | 219/10.55 B X |
| 4,710,859 | 12/1987 | Rilly | 363/21 |
| 4,724,291 | 2/1988 | Inumada | 219/10.55 B |
| 4,742,442 | 5/1988 | Nilssen | 315/106 X |

*Primary Examiner*—William H. Beha, Jr.
*Assistant Examiner*—Emanuel Todd Voeltz
*Attorney, Agent, or Firm*—Antonelli, Terry & Wands

[57] ABSTRACT

In a voltage resonance type switching power source apparatus, which has a step-up transformer, a resonance capacitor connected in series with a primary winding of the transformer, and a transistor connected in parallel with the capacitor to cause a resonant oscillation current by the on-off operation thereof, an on signal of the transistor is produced in synchronism with a second signal, which is obtained by delaying a first signal depending on a voltage induced in a detecting winding provided in the transformer by a predetermined delay time.

24 Claims, 11 Drawing Sheets

FIG. 7d  1ST SIGNAL

FIG. 7e  2ND SIGNAL

FIG. 7f  DELAYED $v_3$

FIG. 7g  ON SIGNAL

FIG. 10a VOLTAGE $E_d$
FIG. 10b SYNC. PULSE
FIG. 10c OUTPUT OF OPE. TERM SETTING CKT 55
FIG. 10d OUTPUT OF ON SIGNAL PRODUCING CKT 38
FIG. 10e OUTPUT OF DELAY CKT 45
FIG. 10f LOAD CURRENT

VOLTAGE RESONANCE TYPE SWITCHING POWER SOURCE APPARATUS

BACKGROUND OF THE INVENTION

1. Field of the Invention

The present invention relates to an improvement of voltage resonance type switching power source apparatus, and especially to an improved power source apparatus capable of operating stably irrespective of the disturbance of the resonance condition caused by an unstable load coupled therewith or some other reasons.

2. Description of the Related Art

As is well known, a switching power source apparatus of a voltage resonance type has a step-up transformer with a primary winding to which an input voltage is applied and a secondary winding by which a high output voltage is supplied for a load. A resonance capacitor is coupled in series with the primary winding of the transformer to form a series resonance circuit, to which a direct current (DC) voltage is applied. Across the capacitor there is provided a switching element such as a transistor, which has a damper diode connected in reverse-parallel therewith.

When the transistor is made to repeat the on-off operation, an alternating voltage is applied to the primary winding of the transformer by the series resonance circuit, so that a high voltage is induced across the secondary winding in accordance with the turn ratio of the transformer. Since the transistor is switched on and off at frequencies as high as 30 KHz, the transformer can be made small in size. Further, if the transistor is switched on and off in accordance with proper timing, the switching loss in the transistor can be decreased. As a result, a small size switching power source apparatus of small size can be realized.

In a voltage resonance type switching power source apparatus as described above, therefore, a signal for switching on a transistor must be produced timely. Otherwise, a large current, which is almost close to a short-circuit current, flows through the transistor, with the result that the transistor fails.

To solve the problem, there has been proposed an apparatus as disclosed in U.S. Pat. No. 4,318,164 (issued on Mar. 2, 1982). According thereto, there is detected a current flowing through a damper diode connected in reverse-parallel to a transistor. The transistor is switched on in synchronism with the detection of the damper diode current. Although details will be described later, the voltage appearing across and the current flowing through the transistor never overlap with each other so that the power loss accompanying the switching operation of the transistor can be greatly reduced.

However, in the case where a load, which consumes power unstably, is coupled with a switching power source apparatus of the voltage resonance type, the condition for the resonance may change irregularly, with the result that a current does not always flow through the damper diode. In such a case, a transistor can not be switched, on and hence the power source apparatus becomes unable to continue normal operation.

SUMMARY OF THE INVENTION

It is an object of the present invention to provide an improvement of a voltage resonance type switching power source apparatus comprising a transformer having a primary winding fed with DC voltage, a capacitor connected with the primary winding to form a resonance circuit and a switching element connected in parallel with the capacitor for intermittently applying the DC voltage to the primary winding by the switching operation thereof to cause a resonant oscillation current, in which a time point of switching on the switching element can be determined exactly, whereby the apparatus is capable of continuing the stable operation irrespective of the disturbance of the resonant condition caused by an unstable load coupled therewith or some other reason.

A feature of the present invention resides in that in such a voltage resonance type switching power source apparatus as described above, control means for controlling the operation of the switching element comprises first means for detecting the change of magnetic flux within a core of the transformer, which is caused by the resonant oscillation current, second means for producing an output signal in synchronism with a time point, at which a voltage appearing across the switching element is presumable to be substantially zero on the basis of a signal output from the first means, and third means responsive to the output signal of the second means for producing an on signal for making the switching element conductive during a predetermined time duration.

According to a typical embodiment of the present invention, the first means include a detecting winding provided in a transformer, which induces a voltage based upon the change of magnetic flux within the core of the transformer. The detecting winding can also provide a control voltage for various parts of the aforesaid control means so that there is no need to provide any special control voltage source.

In a switching power source apparatus of the present invention, the output power thereof can be controlled by varying a duty ratio of the on-off operation of a switching element in accordance with a reference power output by the power source apparatus.

Further, in the case where DC voltage fed to a primary winding of a transformer is obtained by the full-wave rectification of AC voltage, a further improved method of controlling the output power of a switching power source apparatus is provided, in which the term of the on-off operation of a switching element within each half cycle of the AC voltage is controlled in accordance with reference power output by the power source apparatus, whereby the power source apparatus can be operated stably over a wide range of output power, especially in the range of the low output power.

Furthermore, as one of the applications of the present invention, there is provided a switching power source apparatus which is most suitable for use as a high frequency power source apparatus for a magnetron. In this embodiment, a problem particular to a power source apparatus of this kind, is solved, namely, the performance of heating a cathode of a magnetron is enhanced so that the efficiency of the operating time of the power source apparatus and the magnetron is much improved.

Other details including detailed features and advantage of the present invention will become apparent upon reading the specification and inspection of the drawings and will be particularly pointed out in the claims.

DESCRIPTION OF THE PREFERRED EMBODIMENTS

Figure 1:
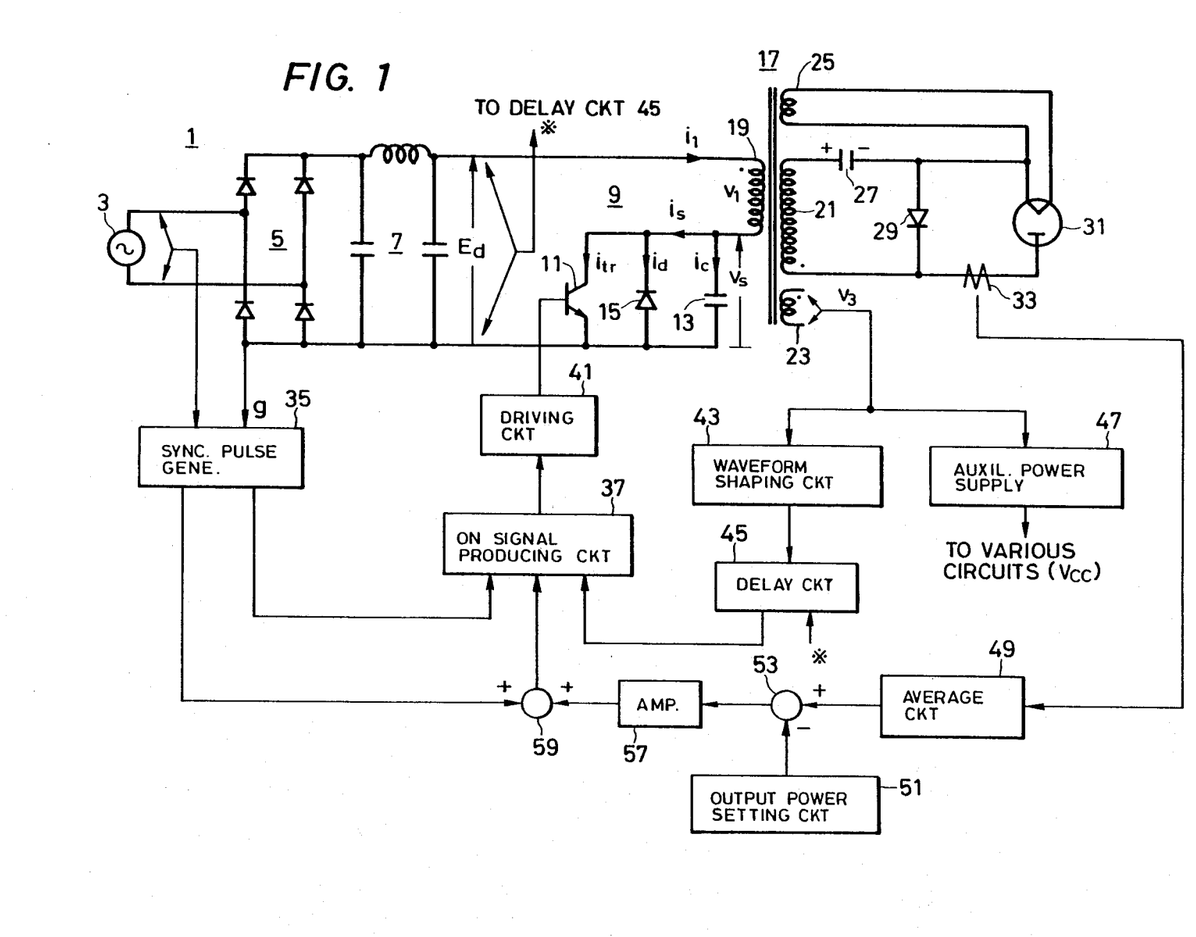
FIG. 1 schematically shows the overall configuration of a voltage resonance type switching power source apparatus according to an embodiment of the present invention.

In the following, some embodiments of the present invention will be described with reference to accompanying drawings. Referring at first to FIG. 1, there is shown an overall configuration of a voltage resonance type switching power source apparatus according to an embodiment of the present invention.

In this figure, a DC power source 1, which supplies DC power for the switching power source apparatus, is composed of a commercial AC power source 3 and a fullwave rectifier 5 connected thereto. The DC power source 1 may be of course a battery. With DC output terminals of the rectifier 5 there is coupled a filter 7 consisting of a reactor and capacitors, which is provided not for smoothing the rectified voltage, but for preventing any components of audio frequencies included in an oscillating current from being transmitted to the AC power side, whereby the generation of noise is avoided.

To this end, a lower limit of a frequency band of the filter 7 is selected to be higher than about 20 KHz, which is almost equal to the upper limit of audio frequencies, and an upper limit thereof is selected to be lower than a frequency of the switching operation so that the operation of a switching device 9 is not affected. With those circuit constants selected as above, the filter 7 scarcely has the effect of smoothing the rectified voltage from the rectifier 5.

The switching device 9 has a transistor 11, which repeats switching on or off under the control operation as described later. The transistor 11 is provided with a damper diode 15 in reverse-parallel therewith. To the switching device 9 there is further coupled a resonance capacitor 13 in parallel therewith. The power source apparatus includes a transformer 17 having a primary winding 19 and three secondary windings 21, 23 and 25. The primary winding 19 is coupled with the filter 7 through the switching device 9 so that a series resonance circuit is formed by the resonance capacitor 13 and the primary winding 19.

A secondary winding 21 is coupled with a magnetron 31 through a voltage doubler rectifier consisting of a capacitor 27 and a diode 29. As will be described in detail later, a magnetron is a typical one of examples of a load which consumes power unstably. There is provided a current transformer 33 in order to detect a load current flowing through the magnetron 31. Another secondary winding 25 is provided for heating a cathode of the magnetron 31. Still another secondary winding 23 functions as a winding for detecting the change of magnetic flux within a core of the transformer 17 to produce an output voltage $V_3$.

Before the description of a control section of the switching power source apparatus, the operation of a power circuit section thereof as described above will be explained with reference to FIGS. 2a to 2h.

Figure 2A:
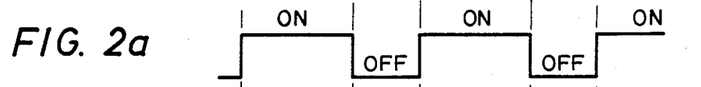
FIGS. 2a to 2h are explanatory drawings of the operation of a switching device used in the power source apparatus shown in FIG. 1.
Figure 2B:
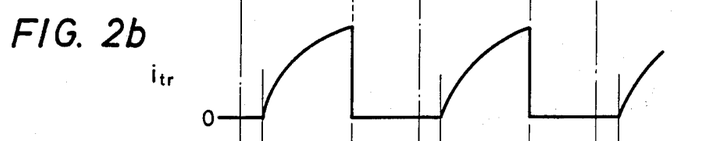

The transistor 11 repeats the on-off operation in accordance with a base signal applied thereto, as shown in FIG. 2a. When the base signal is applied to a base of the transistor 11, a current $i_{tr}$ starts to flow through the transistor 11 at time $t_1$, as shown in FIG. 2b, whereby energy is stored in the primary winding 19.

Figure 2C:
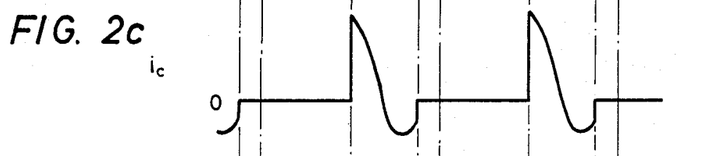
Figure 2D:
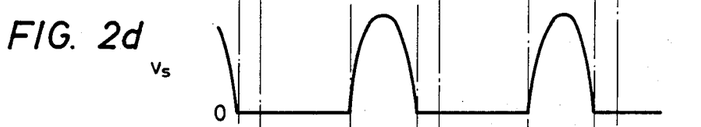
Figure 2E:
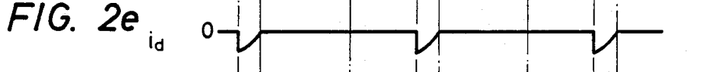

When the transistor 11 is switched off at time $t_2$, the resonant oscillation is initiated and the energy stored in the primary winding 19 is discharged to the capacitor 13. As a result, a current $i_c$ flows through the capacitor 13, as shown in FIG. 2c, so that a voltage $v_s$ of the capacitor 13, i.e., a voltage appearing across the switching device 9, increases from zero, as shown in FIG. 2d. When the current $i_c$ becomes zero, the voltage $v_s$ reaches its peak value, and thereafter it decreases to become zero again at time $t_3$.

The transistor 11 is again switched on in synchronism with the voltage $v_s$ which becomes zero at time $t_3$, as shown in FIG. 2a. However, a part of the oscillating current $i_c$ still continues to flow through the damper diode 15 as shown as a current $i_d$ in FIG. 2e. When the current $i_d$ becomes zero at time $t_4$, the current $i_{tr}$ starts to flow through the transistor 11 again, as shown in FIG. 2b.

Figure 2F:
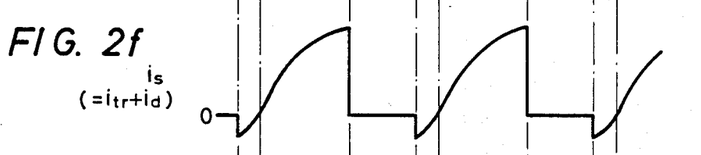
Figure 2G:
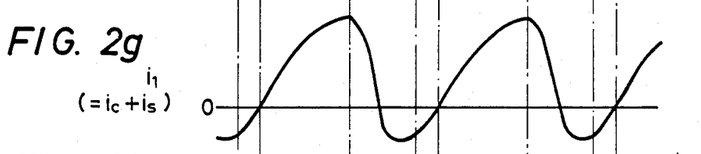
Figure 2H:
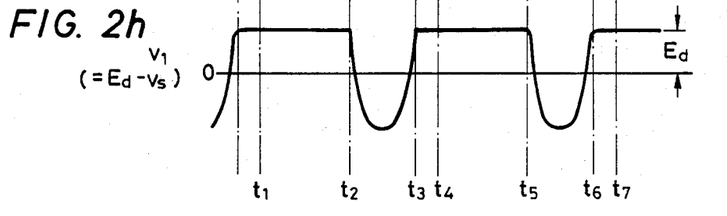

As the result of the repetition of the operation as mentioned above, a current $i_s$, which is a summation of the currents $i_{tr}$ and $i_d$, flows through the switching device 9, as shown in FIG. 2f, and a current $i_1$, which is a summation of the currents $i_c$ and $i_s$, flows through the primary wining 19, as shown in FIG. 2g. Accordingly, a voltage $v_1$ as shown in FIG. 2h appears across the primary winding 19, which is equal to a difference of $E_d$ and $v_s$.

The current $i_1$ as shown in FIG. 2g causes the change of magnetic flux in the core of the transformer 17 so that a high voltage is induced across the secondary winding 21 in accordance with a ratio of a number of turns between the primary and the secondary windings 19 and 21.

Returning to FIG. 1, the explanation will be given to the configuration of the control section of the switching power source apparatus.

There is provided a synchronous pulse generator 35, which receives AC voltage from the power source 3 and generates a pulse in synchronism with a time point at which the AC source voltage becomes zero. Also the generator 35 produces a signal proportional to the instantaneous value of the AC source voltage.

The synchronous pulse output by the generator 35 is coupled to an on signal producing circuit 37, which receives two other signals as described later, in addition to the synchronous pulse, and produces an on signal for rendering the transistor 11 conductive. The on signal is supplied for a base of the transistor 11 through a driving circuit 41.

Figure 4A:
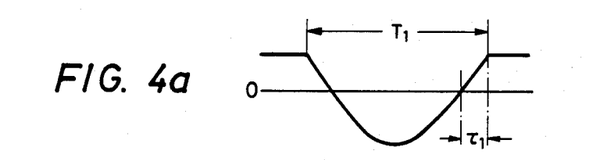
FIGS. 4a and 4b are explanatory drawings of the operation of a delay circuit included in the power source apparatus shown in FIG. 1.
Figure 4B:
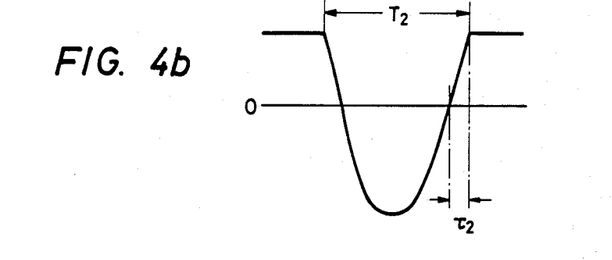

There is further provided a waveform shaping circuit 43, which shapes the waveform of the voltage $V_3$ induced in the detecting winding 33 to produce a first signal. The first signal produced by the shaping circuit 43 is coupled to a delay circuit 45, which produces a second signal by delaying the first signal by a predetermined time $\tau$. An amount of the delay time in the circuit 45 is changed in dependence upon the magnitude of the voltage $E_d$. The reason therefor will become apparent from the explanation described later with reference to FIGS. 4a and 4b. To this end, the delay circuit 45 takes the signal proportional to the voltage $E_d$ thereinto. The second signal output from the delay circuit 45 is coupled to the on signal producing circuit 37 as another input signal.

An average circuit 49 smooths an output of the current transformer 33 to produce a signal proportional to the load current, i.e., an anode current of the magnetron 31 in this case. The output signal of the average circuit 49 is compared in a comparator 53 with a reference of the output power of the switching power source apparatus provided by an output power setting circuit 51 so that a deviation therebetween is obtained. The deviation thus obtained is coupled to an adder 59 through an amplifier 57 and added to the signal from the generator 35, which is in proportion to the instantaneous value of the AC voltage. An output of the adder 59 is coupled to the on signal producing circuit 37 as still another input signal.

Figure 3A:
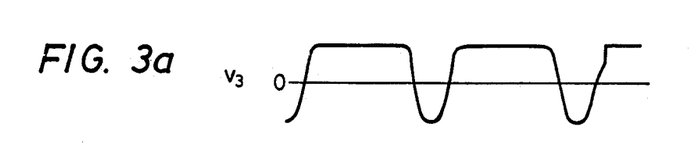
FIGS. 3a and 3b are explanatory drawings of the operation of an auxiliary power supply included in the power source apparatus shown in FIG. 1.
Figure 3B:
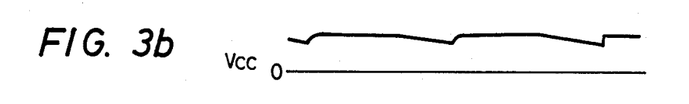

Further, an auxiliary power supply 47 rectifies and smooths the voltage $v_3$ induced in the detecting winding 23 to produce a control voltage source $V_{cc}$, as shown in FIGS. 3a and 3b. The thus obtained $V_{cc}$ is supplied for the various circuits and devices as mentioned above. With this construction, there is no need to provide any special control voltage source additionally.

Figure 5A:
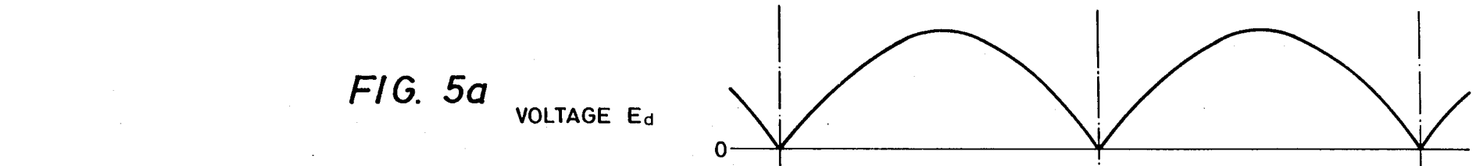
FIGS. 5a to 5e are explanatory drawings of the output power control of the power source apparatus shown in FIG. 1.
Figure 5B:
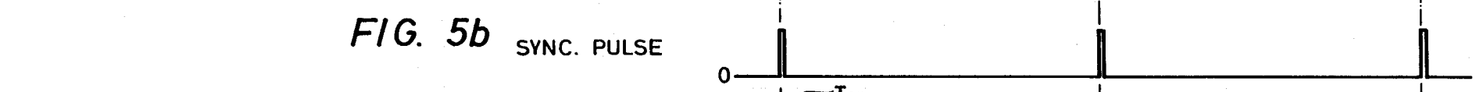

Referring to FIGS. 5a to 5e, there are shown waveforms of various parts of the switching power source apparatus. As shown in FIG. 5a, the output voltage $E_d$ of the filter 7 has the waveform almost similar to that of the usual full-wave rectification, because, as already described, the filter 7 scarcely has the effect of smoothing the rectified voltage. The synchronous pulse generator 35 generates the synchronous pulse every time when the AC source voltage is zero, as shown in FIG. 5b.

Figure 5C:
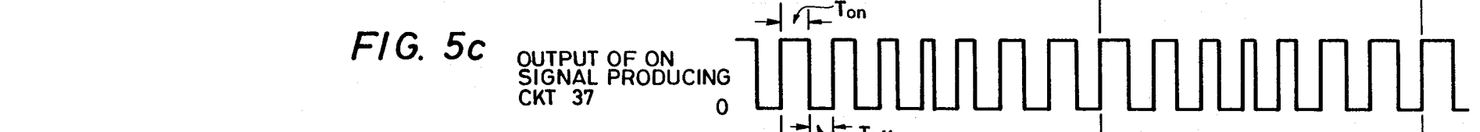
Figure 5D:
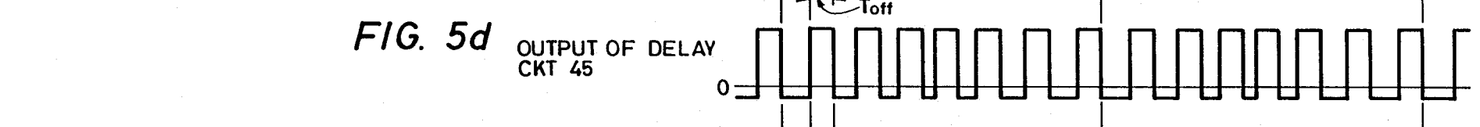

The on signal producing circuit 37 produces the on signals as shown in FIG. 5c. A first on signal within each cycle of the pulsating voltage $E_d$ as shown in FIG. 5a, which corresponds to each half cycle of the AC source voltage, is produced in synchronism with the synchronous pulse shown in FIG. 5b. On signals following the first one are produced in synchronism with trailing edges of the outputs of the delay circuit 45.

The time duration of each of the thus produced on signals is determined by the signal from the adder 59 so that it becomes narrow as the instantaneous value of the voltage $E_d$ is large, whereby the saturation of the core of the transformer 17 is prevented. The on signals produced in the manner described above are supplied for the transistor 11 as a base signal through the driving circuit 41.

Figure 5E:
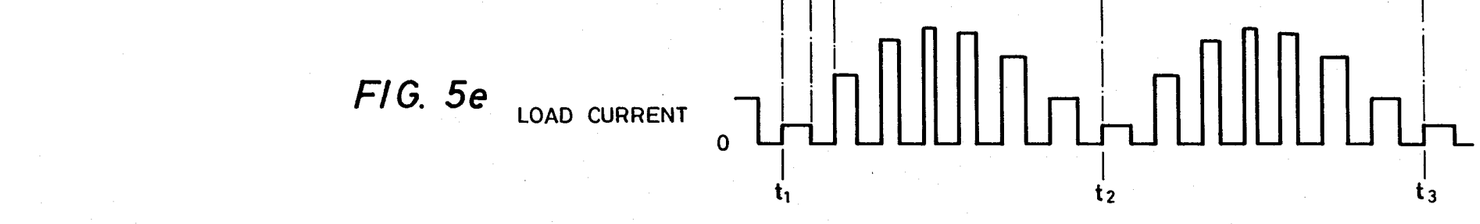

As the result of the on-off operation of the transistor 11 in accordance with the base signal as described above, the high voltage is induced across the secondary winding 21 in the manner as already described, and the load current as shown in FIG. 5e flows through a load. Further, in FIG. 5e, there is shown the load current in the steady state of the magnetron 31.

The output power is adjusted by controlling a duty ratio of the on-off operation, i.e., a ratio of an on time duration $T_{on}$ to a period $T_{on}+T_{off}$ of the on-off operation, of the transistor 11. In this case, the on time duration $T_{on}$ is varied with an off time duration $T_{off}$ maintained constant, because, as is apparent from FIG. 2c, the current $i_c$ caused by the resonant oscillation flows during $T_{off}$ and the period of the resonant oscillation is determined by the capacitor 13 and the primary winding 17.

Figure 6:
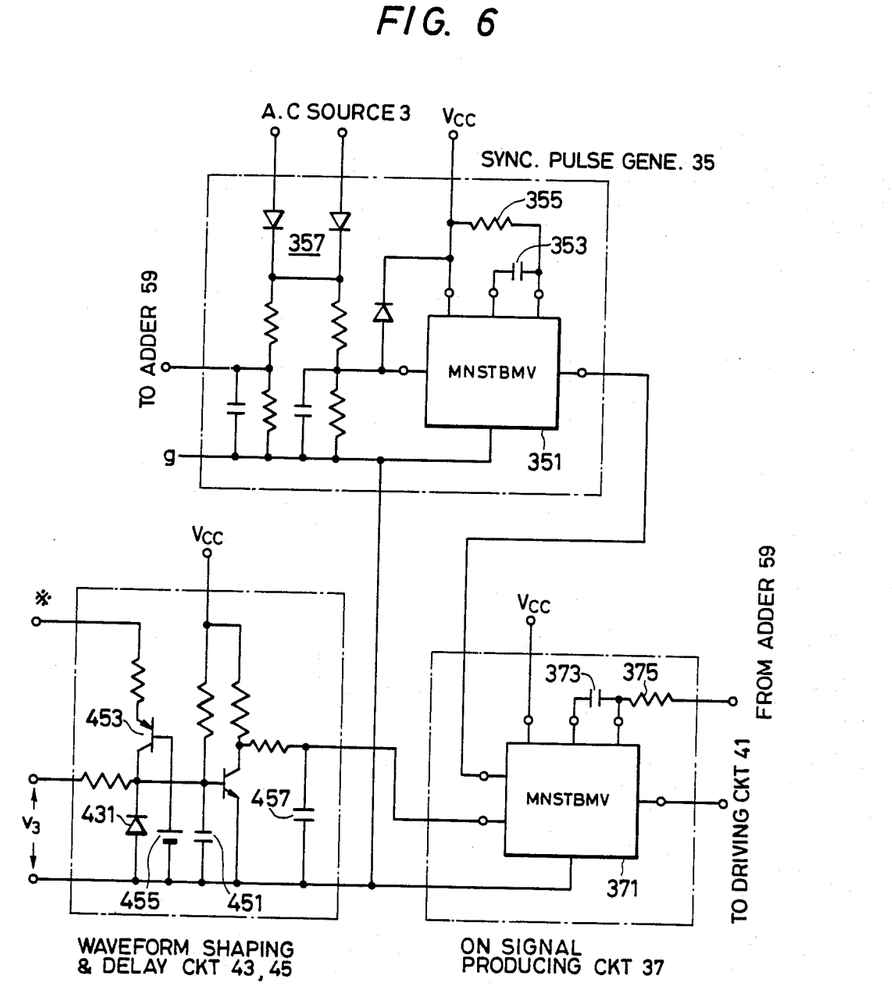
FIG. 6 shows a detailed circuit arrangement of a part of control means included in the power source apparatus shown in FIG. 1.

Referring to FIG. 6, there is shown the detailed arrangement of circuits of the synchronous pulse generator 35, the on signal producing circuit 37, the waveform shaping circuit 43 and the delay circuit 45, which form the principal portion of the present embodiment. Further, it is to be noted that in this figure the waveform shaping circuit 43 and the delay circuit 45 are shown in the united form.

As shown in the figure, the synchronous pulse generator 35 has a monostable multivibrator 351, which is triggered when the AC source voltage applied to a trigger terminal thereof through a rectifier 357 is zero. The width of an output pulse of the multivibrator 351, i.e., that of the synchronous pulse, depends on a time constant determined by a capacitor 353 and a resistor 355.

In the waveform shaping and delay circuit 43, 45, the voltage $v_3$ of the detecting winding 23 is shaped by a circuit including a diode 431. A voltage across the diode 431 is delayed by a delay circuit including a capacitor 451. The capacitor 451 is charged through a circuit including a transistor 453, when the voltage $E_d$ exceeds a voltage determined by a DC voltage reference 455. As a result, the amount of the delay time $\tau$ is changed in accordance with the voltage $E_d$, as already described and as shown by $\tau_1$ and $\tau_2$ in FIGS. 4a and 4b. The voltage across the capacitor 451 is amplified and output to the on signal producing circuit 37. A capacitor 457 is for preventing the malfunction caused by noise.

The on signal producing circuit 37 has a monostable multivibrator 371, which is triggered by two input signals, i.e., the synchronous pulse from the generator 35 and the output signal of the waveform shaping and delay circuit 43, 45. Therefore, the on signal producing circuit 37 can produce the first on signal within each cycle of the pulsating voltage $E_d$ in synchronism with the synchronous pulse from the generator 35 and the on signals following the first one in response to the output signals of the waveform shaping and delay circuit 43, 45.

The width of the output pulse of the multivibrator 371 is determined by a time constant of a series connection of a capacitor 373 and a resistor 375 and a voltage applied to the series connection from the adder 59. Therefore, the duration of the on signal depends on the deviation between the reference of the output power and the actual value thereof and the instantaneous value of the AC source voltage.

Figure 7A:
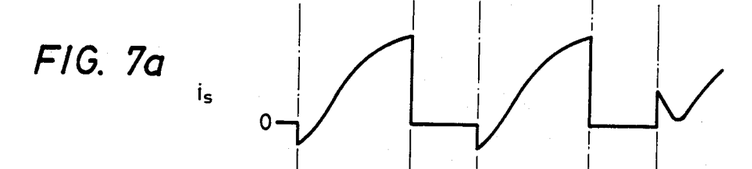
FIGS. 7a to 7g are explanatory drawings of the operation of the power source apparatus shown in FIG. 1.
Figure 7B:
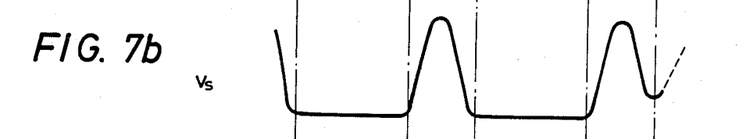
Figure 7C:
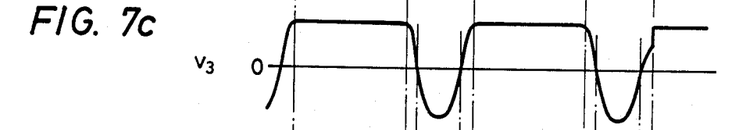

Referring next to FIGS. 7a to 7g, the explanation will be made of the operation of the principal portion, as shown in FIG. 6, of the present embodiment. FIGS. 7a and 7b show the current $i_s$ and the voltage $v_s$ of the switching device 9, which correspond to FIGS. 2f and 2d, respectively. FIG. 7c shows a waveform of the voltage $v_3$ induced in the detecting winding 23, which is similar to the waveform of the voltage $v_1$ as shown in FIG. 2h.

Figures 7D, 7E:
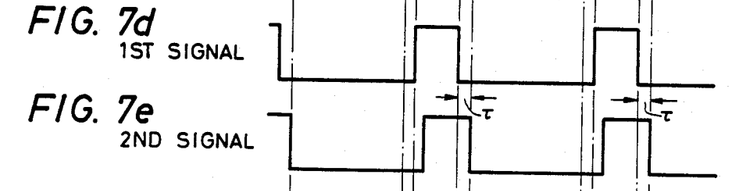

On the basis of the voltage $v_3$, the first signal as shown in FIG. 7d is produced. The waveform shaping circuit 43 at first slices the voltage $v_3$ at a threshold level of zero and produces the first signal during the voltage $v_3$ is negative. As apparent from the comparison between FIGS. 7b and 7d, there exists a time difference $\tau$ between a time point at which the voltage $v_s$ becomes zero and the trailing edge of the first signal.

Then, if the first signal is delayed by the time $\tau$, there is obtained a second signal as shown in FIG. 7e, the trailing edge of which coincides with the time at which the voltage $v_s$ becomes zero. The delay circuit 45 provides this delay time $\tau$. Further, since the time difference $\tau$ depends on the threshold level of slicing the voltage $v_3$, the delay time is necessary to be determined accordingly.

Figure 7F:
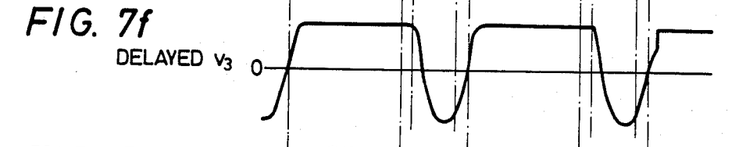
Figure 7G:
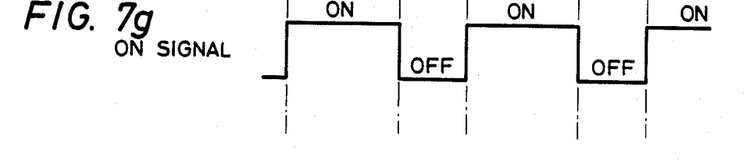

The on signal producing circuit 37 is triggered by the trailing edge of the second signal to produce the on signal, as shown in FIG. 7g. Accordingly, the leading edge of the on signal coincides with the time at which the voltage $v_s$ becomes zero. Therefore, even if the voltage $v_s$ does not actually become zero or even if there is no current $i_d$ flowing through the damper diode 15, because of the disturbance of the resonant condition, the on signal can be always produced.

Further, the second signal as shown in FIG. 7e can be produced also by interchanging the waveform shaping circuit 43 and the delay circuit 45 in their order. Namely, the detected voltage $v_3$ is at first delayed by the time $\tau$ in a delay circuit, as shown in FIG. 7f. Thereafter, the waveform shaping circuit 43 shapes the delayed voltage $v_3$ to produce the second signal as shown in FIG. 7e.

Moreover, it will be understood that the on signal as shown in FIG. 7g can be obtained directly from the delayed voltage $v_3$ as shown in FIG. 7f. Namely, the on signal producing circuit 37 is triggered when the delayed voltage $v_3$ changes from negative to positive.

One of the above mentioned variations of producing the on signal will be selected in accordance with necessity of the control. In essence, the present invention is characterized by detecting the change of magnetic flux within the core of the transformer 17 by the voltage $v_3$ appearing across the detecting winding 23 and producing the on signal of the transistor 11 on the basis of the detected result.

By the way, as apparent from FIG. 2h and FIG. 7c, the voltage $v_1$ appearing across the primary winding 19 and the voltage $v_3$ induced in the detecting winding 23 have the same waveform. Therefore, it will be able to be understood therefrom that the time point, at which the on signal should be produced, can be also detected by using the voltage $v_1$. This makes the transformer 17 small in size, because the detecting winding 23 can be omitted. In this case, however, a control voltage source must be provided separately. It can be arbitrarily selected which is adopted, a transformer with a detecting winding or a transformer without a detecting winding.

In the embodiment described above, the output power of the switching power source apparatus has been controlled by varying the duty ratio of the switching operation of the transistor 11. In the following, there will be described another embodiment, in which the output power of the switching power source apparatus is controlled by a different method.

Figure 8:
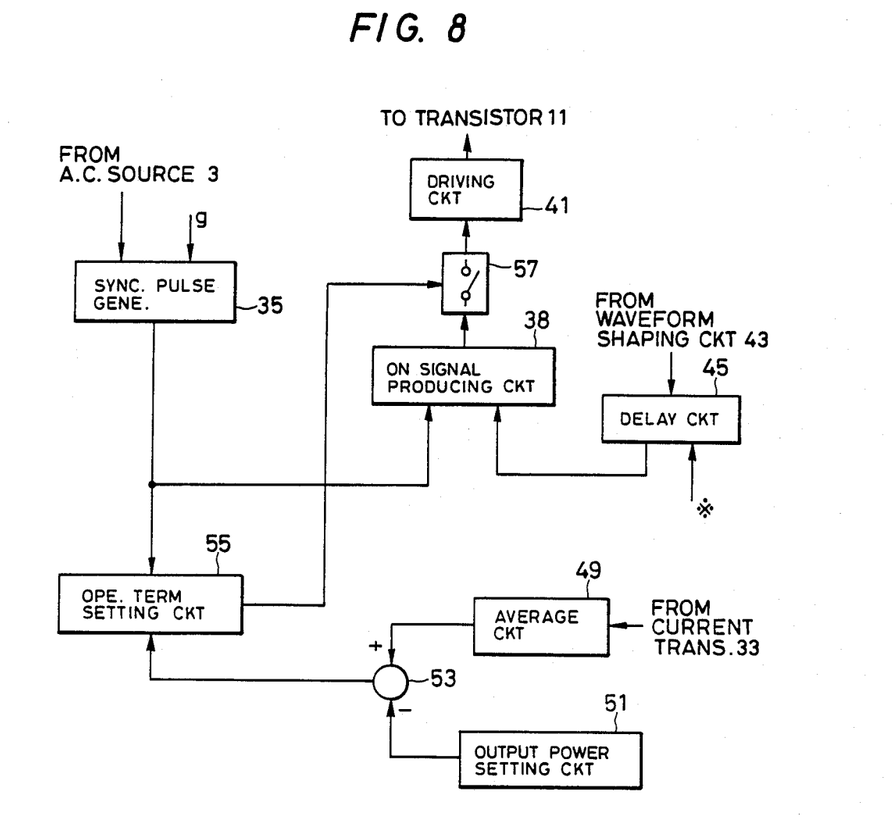
FIG. 8 is a block diagram showing a part of the configuration of a switching power source apparatus according to another embodiment of the present invention.

Referring to FIG. 8, there is shown a part of the configuration of a switching power source apparatus according to the previous embodiment, which is pertinent to present embodiment. The remaining part thereof is identical to the configuration of FIG. 1. Further, in FIG. 8, like reference numerals denote like components in FIG. 1.

In this embodiment, there are provided an operation term setting circuit 55, which determines the term of the on-off operation of the transistor 11 within each cycle of the pulsating voltage $E_d$, i.e., each half cycle of the AC source voltage, and a control switch 57 which, when the signal produced by the operation term setting circuit 55 is present, is switched on to make the on signal from an on signal producing circuit 38 pass therethrough to the driving circuit 41. Therefore, the transistor 11 repeats switching on or off only during the existence of the signal from the operation term setting circuit 55.

Further, in FIG. 8, the on signal producing circuit is denoted by the reference numeral 38, which is different from that in FIG. 1. This is because the circuit 38 in FIG. 8 is somewhat different from 37 in FIG. 1. The latter had the function of controlling the duty ratio of the on-off operation of the transistor 11 in order to adjust the output power, whereas the former is not provided with that function because the output power is adjusted by a different method as described below. The difference between the former circuit and the latter will be apparent from the detailed circuit arrangement shown in FIG. 9.

Figure 9:
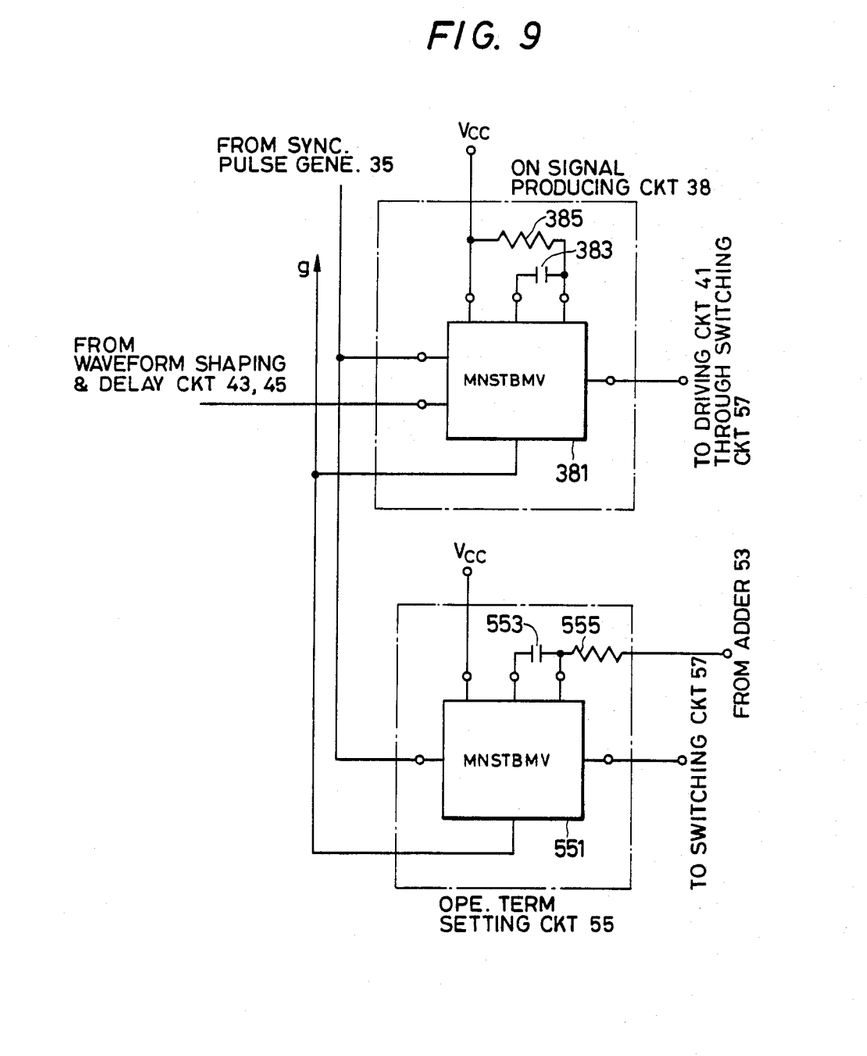
FIG. 9 shows a detailed circuit arrangement of a part of control means included in the power source apparatus of FIG. 8.

As shown in the figure, the on signal producing circuit 38 has a monostable multivibrator 381, the time constant of which is fixedly determined by a capacitor 383 and a resistor 385. The time constant circuit consisting of the capacitor 383 and the resistor 385 is coupled to the constant control voltage source $V_{cc}$.

However, the time constant circuit can be supplied with the signal proportional to the instantaneous value of the AC source voltage, which is produced by the synchronous pulse generator 35, whereby the width of the on signal becomes small as the instantaneous value of the AC source voltage becomes large, so that the saturation of the core of the transformer 17 can be prevented in the same manner as in FIG. 1.

The operation term setting circuit 55 has a monostable multivibrator 551, the time constant of which is determined by a time constant circuit consisting of a capacitor 553 and a resistor 555 and a voltage applied to the time constant circuit from the adder 53. Therefore, the width of the on signal is determined in accordance with the deviation between the output power reference provided by the output power setting circuit 51 and the actual value thereof output by the average circuit 49.

Figures 10A, 10B, 10C:
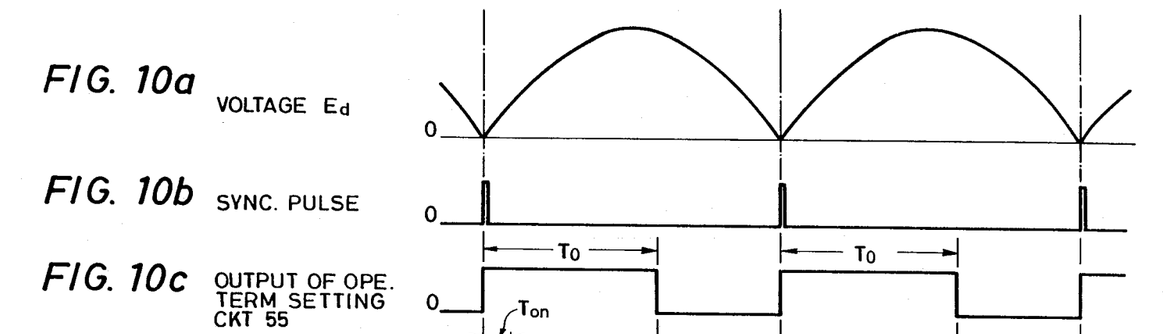
FIGS. 10a to 10f are explanatory drawings of the operation of the power source apparatus shown in FIG. 8.

Referring to FIGS. 10a to 10f, the operation of the operation term setting circuit 55 and the control switch 57 will be explained. In the figures, FIGS. 10a and 10b show the pulsating voltage $E_d$ and the synchronous pulse, which correspond to those as shown in FIGS. 5a and 5b. The operation term setting circuit 55 produces an operation term signal as shown in FIG. 10c, which builds up in synchronism with the synchronous pulse shown in FIG. 10b and has the width of $T_0$ determined in the manner as described above.

The operation term signal determines a time duration, in which the transistor 11 is to repeat the on-off operation within each cycle of the pulsating voltage $E_d$. Namely, the transistor 11 repeats switching on or off only between $t_1$ and $t_2$ or $t_3$ and $t_4$, every each cycle of the pulsation of the voltage $E_d$.

Figure 10D:
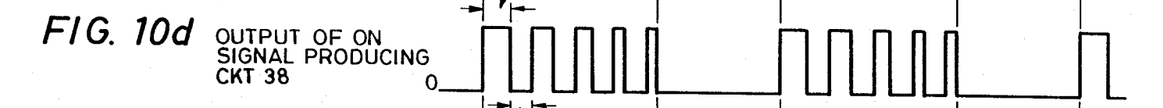
Figure 10E:
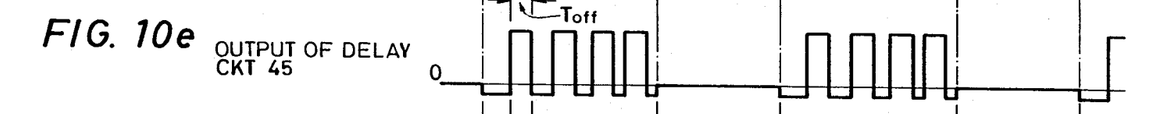
Figure 10F:
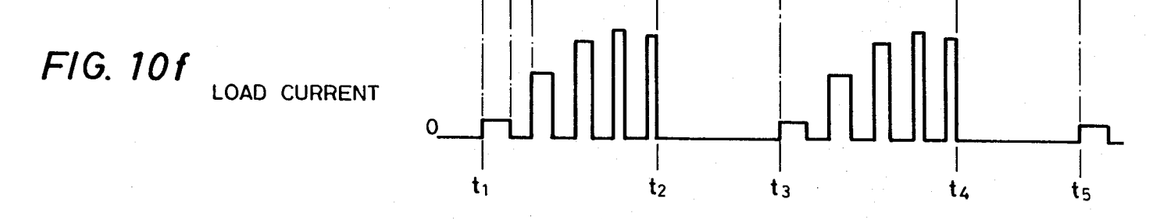

Therefore, as shown in FIG. 10d, the on signals are produced by the on signal producing circuit 38 only during the term from $t_1$ to $t_2$ or from $t_3$ to $t_4$ for every cycle of the pulsation of the voltage $E_d$. Since the production of the on signal stops at time $t_2$ or $t_4$, the resonant oscillation stops at that time so that the outputs of the delay circuit 45 also disappear, as shown in FIG. 10e. As a result, the load current is controlled in a manner as shown in FIG. 10f. If, therefore, the width $T_0$ of the signal of the operation term setting circuit 55 is varied, the output power of the switching power source apparatus can be controlled.

According to this embodiment of controlling the output power, the switching power source apparatus can be stably operated even in the range of very low output power. In the output power adjustment by means of the duty ratio control as already described, the on time becomes very narrow in the range of low output power, especially, during the instantaneous value of the voltage $E_d$ is large. In such a condition, the energy stored in the primary winding 19 becomes insufficient, with the result that the resonant oscillation is made incomplete. On the contrary, in the present embodiment, the minimum width of the on signal can be secured so as to be necessary for storing enough energy in the primary winding 19 to continue the stable resonant oscillation.

By the way, there occurs a particular problem in the case where a switching power source apparatus as described above is used as a power source apparatus for an unstable load such as a magnetron and operated at high frequencies. In the following, there will be described still another embodiment, by which a suitable power source apparatus for a magnetron is provided.

As is well known, in a magnetron, electrons are emitted from a cathode to an anode by applying high voltage of about 4 kilovolts therebetween under the condition that the cathode is heated to about 1700° C. by a heater, and a microwave is radiated by the aforesaid movement of the electrons.

Therefore, when the voltage is applied to the magnetron, an anode current does not flow between an anode and a cathode thereof for a while, until the temperature of the cathode reaches a predetermined value. Since, in the mean time, the power source is in the no-load condition, the voltage applied to the magnetron is higher than that in the steady-state operation of the magnetron. This state is called a starting state.

If the temperature of the cathode rises and electrons start to be emitted, the anode current starts to flow and increases gradually with the temperature of the cathode, and the voltage of the anode decreases accordingly. This state is called a transient state. When the cathode is sufficiently heated, a steady-state current flows through the magnetron, and also the voltage of the anode becomes a steady-state value. This last state is called a steady-state.

In the case where a high frequency power source is used for driving a magnetron, reactance existing in a heater circuit of the magnetron functions as a large impedance that is never negligible because of the high frequency of the voltage applied to the heater circuit. The large impedance causes a large voltage drop thereacross, so that the voltage for heating a cathode becomes insufficient. As a result, it takes a considerably long time, e.g., 5 to 6 seconds, for the cathode to be heated up to the temperature necessary for the steady-state operation of the magnetron. This decreases the efficiency of the operating time very much. Therefore, the cathode must be heated up to the predetermined temperature as rapidly as possible even in the case where the high frequency power source is used.

Referring to FIGS. 11a to 11d, a method of rapid heating of a cathode of a magnetron will be explained. Since this method relates only to how to set the reference of the output power of a power source apparatus, details of a structural configuration for carrying out this method are omitted.

Figure 11A:
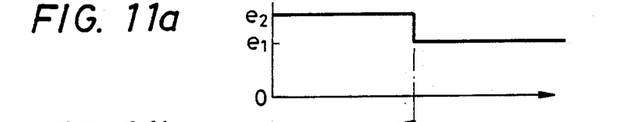
FIGS. 11a to 11d are explanatory drawings of the operation of heating a cathode of a magnetron, when the apparatus as shown in FIG. 1 or 8 is used as a switching power source apparatus for a magnetron.

As shown in FIG. 11a, just after the start of operation of a switching power source apparatus, an output power reference is set at $e_2$, which is somewhat larger than $e_1$ as a reference for the steady-state operation of a magnetron. By setting the large reference $e_2$ the on signal producing circuit 37 or 38 produces the on signal of the transistor 11, which has a longer time duration than that produced when $e_1$ is set. Since the off time duration of the transistor 11 is fixed, if the on time duration thereof becomes long, the frequency of the on-off operation of the transistor 11 becomes low, whereby the impedance caused by the reactance existing in the heater circuit decreases and sufficiently high voltage can be applied to the heater.

Figure 11B:
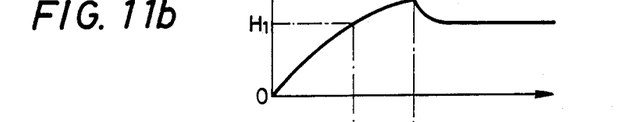
Figure 11C:
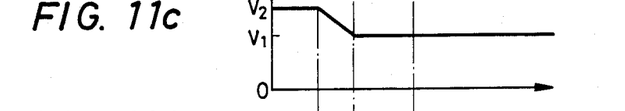
Figure 11D:
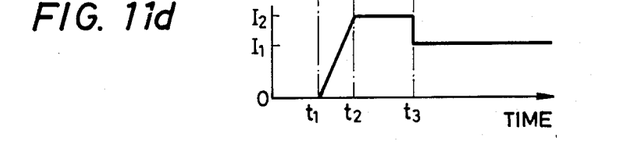

The heater is rapidly heated by the application of the sufficient voltage, as shown in FIG. 11b. In the mean time, however, a voltage $v_2$, which is higher than a steady-state voltage $v_1$, appears across the magnetron, as shown in FIG. 11c, since the emission of electrons is not yet initiated and therefore no anode current flows, as shown in FIG. 11d. When the emission of electrons is initiated and the anode current starts to flow at time $t_1$, the voltage of the anode decreases with the increase of the anode current.

When the temperature of the cathode reaches a predetermined value $H_1$ at time $t_2$, as shown in FIG. 11b, an anode current $I_2$, which is larger than a steady-state anode current $I_1$, flows because the output power reference is $e_2$, which is larger than the reference $e_1$ for the steady-state. The anode voltage reaches a steady-state value $V_1$ at time $t_2$ and is maintained at that value thereafter, so long as the anode current continues to flow. When the output power reference is made the steady-state value $e_1$ at time $t_3$, the anode current decreases down to the steady-state value $I_1$ and the temperature of the heater also becomes the steady-state value $H_1$.

To achieve the above mentioned control, it is sufficient to only prepare in advance two levels such as $e_1$ and $e_2$ as the output power reference in the output power setting circuit 51 and to change the reference between the two levels in response to an output signal of a timer, which provides the time limit, which corresponds to a time from zero to $t_3$ in the figure. With this, the heating of a cathode of a magnetron is rapidly completed.

Figure 12:
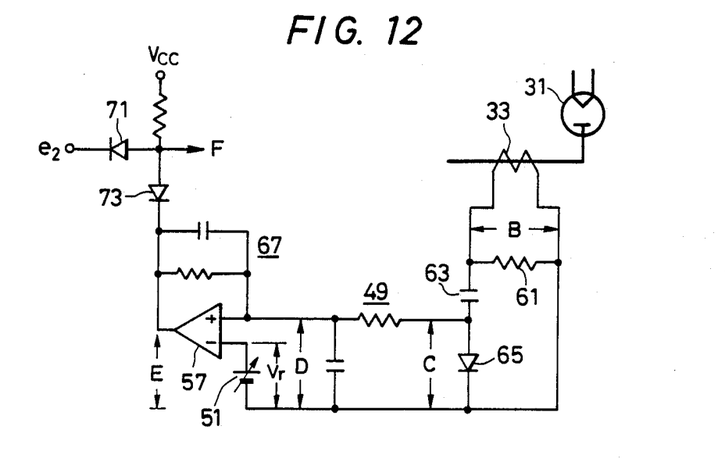
FIG. 12 schematically shows a part of a circuit arrangement of producing a reference of an output power of a switching power source apparatus for a magnetron.

Referring further to FIG. 12, there will be described another example of the rapid heating of a cathode of a magnetron. FIG. 12 shows only a part relating to the heating of a cathode and the remaining part is the same as that in FIG. 1 or 8. Also in the figure, like reference numeral denote like elements in those figures. Further, voltage appearing across portions indicated by a to F in FIG. 12 are shown in FIGS. 14b to 14e, respectively.

Figure 14A:
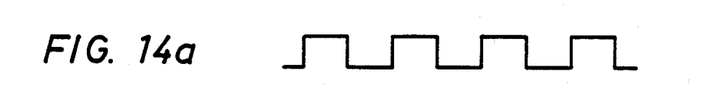
FIGS. 14a to 14e are explanatory drawings of the operation of the output power reference producing circuit shown in FIG. 12.
Figure 14B:
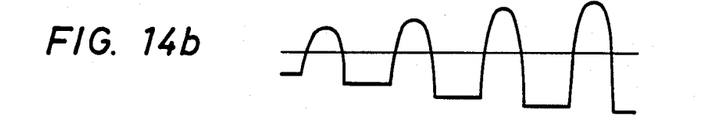
Figure 14C:
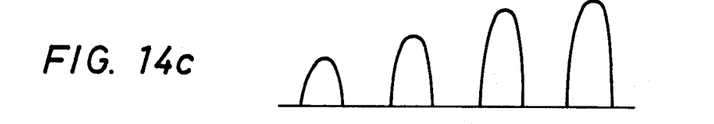

As shown in FIG. 12, a load resistor 61 is coupled to the current transformer 33. A voltage as shown in FIG. 14b appears across the resistor 61 in accordance with the on-off operation of the transistor 11 as shown in FIG. 14a. There is provided a series connection of a capacitor 63 and a diode 65 across the resistor 61. By the function of this series connection, a voltage as shown in FIG. 14c appears across both ends of the diode 65.

Figure 14D:
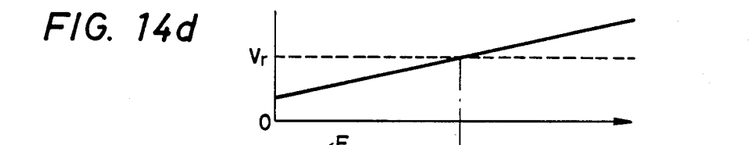

Across the ends of the diode 65, there are further connected a resistor and a capacitor, which form the average circuit 49 for smoothing the voltage appearing across the diode 65. As a result, a voltage as shown in FIG. 14d appears across both terminals of the capacitor of the average circuit 49. Therefore, the voltage appearing across the capacitor is in proportion to a load which is consumed by the magnetron 31.

The voltage appearing across the capacitor is coupled to one (plus) of the terminals of the amplifier 57, which has a delay element 67 consisting of a capacitor and a resistor in its feedback circuit. To the other terminal (minus) of the amplifier 57 there is applied the output power reference $V_r$ provided by the output power setting circuit 51. As a result, there appears a voltage as shown by a line E in FIG. 14e at an output terminal of the amplifier 57. The output power reference $V_r$ is illustrated by a broken line in FIG. 14d.

The output voltage of the amplifier 57 is coupled to a cathode of a diode 73, which forms a low value precedence circuit together with a diode 71. To a cathode of the diode 71, a constant value $e_2$, which corresponds to the maximum value of the output power reference, is applied. Anodes of both the diodes 71, 73 are connected in common with the control voltage source $V_{cc}$.

The output voltage of the amplifier 57 is set so as to be sufficiently higher than the reference $e_2$, the output voltage of the average circuit 49 is low. Therefore, just after the start of operation of the switching power source apparatus, the voltage $e_2$ is output to a connecting point F of the anodes of the diodes 71, 73.

Figure 14E:
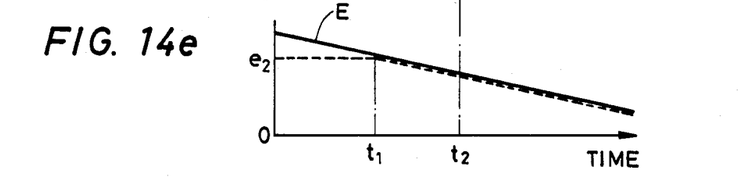

As the output voltage of the average circuit 49 increases, the output voltage of the amplifier 57 decreases, as shown in FIGS. 14d and 14e. When the output voltage of the amplifier 57 becomes lower than $e_2$ at time $t_1$, the voltage appearing at the point F becomes the output voltage of the amplifier 57. As a result, a voltage appearing at the point F changes as shown by a broken line in FIG. 14e with respect to time. In this manner, it is possible to obtain the output power reference, which changes gradually with respect to time.

Figure 13A:
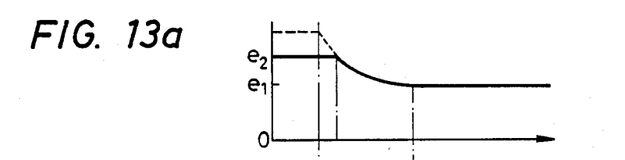
FIGS. 13a to 13d are explanatory drawings of the operation of heating a cathode of a magnetron, when the reference producing circuit of FIG. 12 is applied to a switching power source apparatus as shown in FIG. 1 or 8 used as power source for a magnetron.
Figure 13B:
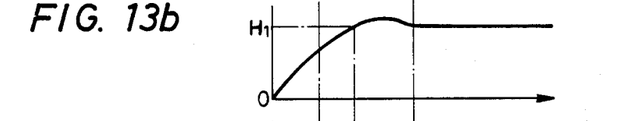
Figure 13C:
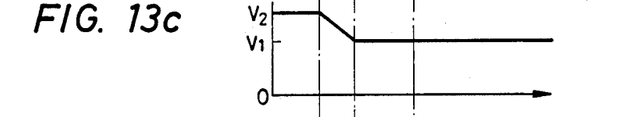
Figure 13D:
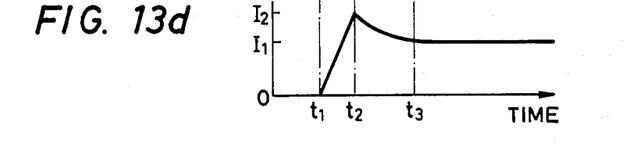

The manner of the cathode heating operation, as described above, is shown in FIGS. 13a to 13d. The operation itself is similar to that already described with reference to FIGS. 11a to 11d. There is a difference therebetween in the form of the output power reference, as shown in FIG. 13a. By the output power reference as shown in FIG. 13a, the anode current can change smoothly from the maximum value $I_2$ to the steady-state value $I_1$, as shown in FIG. 13d.

As described above, the present invention can realize a switching power source apparatus, which is capable of always operating stably irrespective of the disturbance of the resonant condition caused by an unstable load. Further, according to one of the features of the present invention, the output power of a switching power source apparatus can be controlled stably over a wide range, especially in the range of a small output power.

Moreover, according to one of desirable applications of the present invention, a high frequency power source apparatus for a magnetron can be realized, by which the heating time of a cathode of the magnetron is shortened very much so that the efficiency of the operating time of the magnetron is much improved.

Although we have herein shown and described only some forms of apparatus embodying the present invention, it is understood that various changes and modifications may be made therein within the scope of the appended claims without departing from the spirit and scope of the present invention.

We claim:

1. A switching power source apparatus having:
   a DC power source;
   a transformer having at least a primary winding fed by said DC power source and a secondary winding coupled to a load;
   switching means coupled in series with the primary winding and repeating the on-off operation in response to an on signal;
   a capacitor coupled in parallel with said switching means to form a resonant circuit together with the primary winding;
   control means for periodically producing the on signal for rendering said switching means conductive for a predetermined time duration,
   characterized in that said control means comprises
   first means for detecting the change of magnetic flux within a core of said transformer, which is caused by the on-off operation of said switching means;
   second means for producing, on the basis of an output of said first means, an output signal at a time point corresponding to a time at which a voltage appearing across said switching means is presumed to be substantially zero; and
   third means for producing the on signal for the predetermined time duration in response to the output signal of said second means.

2. A switching power source apparatus as defined in claim 1, wherein said first means includes a winding provided in said transformer for detecting the change of the magnetic flux within the core of said transformer.

3. A switching power source apparatus as defined in claim 2, wherein said second means includes means for producing a first signal when the voltage induced in the detecting winding exceeds a certain threshold level and means for producing a second signal by delaying the first signal by a predetermined delay time, and said third means produces the on signal in response to the second signal.

4. A switching power source apparatus as defined in claim 3, wherein the delay time is changed in accordance with the magnitude of a voltage of said DC power source.

5. A switching power source apparatus as defined in claim 2, wherein said second means includes means for producing a first signal by delayed the voltage induced in the detecting winding by a predetermined delay time and means for producing a second signal when the first signal exceeds a certain threshold level, and said third means produces the on signal on the basis of the second signal.

6. A switching power source apparatus as defined in claim 5, wherein the delay time is changed in accordance with the magnitude of a voltage of said DC power source.

7. A switching power source apparatus as defined in claim 2, wherein the detecting winding provides a control voltage for said control means.

8. A switching power source apparatus as defined in claim 1, wherein said first means includes means for detecting the change of the magnetic flux within the core of said transformer means by a voltage appearing across the primary winding of said transformer.

9. A switching power source apparatus as defined in claim 8, wherein said second means includes means for producing a first signal when the voltage induced in the primary winding exceeds a certain threshold level and means for producing a second signal by delaying the first signal by a predetermined delay time, and said third means produces the on signal in response to the second signal.

10. A switching power source apparatus as defined in claim 9, wherein the delay time is changed in accordance with the magnitude of a voltage of said DC power source.

11. A switching power source apparatus as defined in claim 8, wherein said second means includes means for producing a first signal by delaying the voltage of the primary winding by a predetermined delay time and means for producing a second signal when the first signal exceeds a certain threshold level, and said third means produces the on signal on the basis of the second signal.

12. A switching power source apparatus as defined in claim 11, wherein the delay time is changed in accordance with the magnitude of a voltage of said DC power source.

13. A switching power source apparatus as defined in claim 1, wherein said third means has means for controlling a duty ratio of the on-off operation of said switching means in accordance with a reference of an output power of the power source apparatus.

14. A switching power source apparatus as defined in claim 13, wherein the duty ratio is controlled by varying the time duration of the on signal in accordance with the output power reference while maintaining the duration of an off time of said switching means fixed.

15. A switching power source apparatus as defined in claim 1, wherein said DC power source means produces a DC voltage by the full-wave rectification of an AC voltage of a commercial frequency, there is further provided synchronous pulse generator means for generating a synchronous pulse every time the AC voltage becomes zero, and said third means produces the on signal in response to the output signal of said second means and the synchronous pulse.

16. A switching power source apparatus as defined in claim 15, wherein said third means produces the on signal only in a certain term within each half cycle of the AC voltage from the generation of the synchronous pulse and the certain term is varied in accordance with a reference for an output power of the power source apparatus.

17. A switching power source apparatus as defined in claim 1, wherein there is provided a filter between said DC power source and a series connection of the primary winding and said switching means, which is a high pass filter having a cut-off frequency almost equal to the uppermost of audio frequencies.

18. A switching power source apparatus for a magnetron according to claim 1, wherein the load connected to the secondary winding is a magnetron, which has a heater for heating a cathode of the magnetron, and said transformer has a winding for feeding the heater.

19. A switching power source apparatus for a magnetron as defined in claim 18, wherein there is provided a timer for setting a predetermined time limit from the start of operation of the power source apparatus, and said third means makes the time limit duration of the on signal during the predetermined time limit longer than that in the steady-state operation of the magnetron.

20. A switching power source apparatus for a magnetron as defined in claim 19, wherein the time duration of the on signal during the predetermined time limit is shortened stepwise in accordance with the lapse of the operating time of the magnetron.

21. A switching power source apparatus for a magnetron as defined in claim 19, wherein the time duration of the on signal during the predetermined time limit is shortened continuously in accordance with the lapse of the operating time of the magnetron.

22. A switching power source apparatus for a magnetron as defined in claim 18, wherein said third means produces the on signal such that a duty ratio of the on-off operation of said switching means becomes small stepwise in accordance with the lapse of the operating time of the magnetron.

23. A switching power source apparatus for a magnetron as defined in claim 18, wherein there is further provided current detecting means for detecting an anode current of the magnetron and said third means produces the on signal such that a deviation between a reference value of the anode current and the detected value thereof is made substantially zero.

24. A switching power source apparatus for a magnetron as defined in claim 18, wherein there is further provided current detecting means for detecting a current flowing through the primary winding and said third means produces the on signal such that a deviation between a reference value of the current of the primary winding and the detected value thereof is made substantially zero.

* * * * *